United States Patent [19]
Hareyama

[11] Patent Number: 5,657,464
[45] Date of Patent: Aug. 12, 1997

[54] DATA TRANSFER CIRCUIT FOR USE WITH A BASE UNIT OR A HANDSET OF A TELEPHONE SYSTEM

[75] Inventor: Nobuo Hareyama, Kanagawa, Japan

[73] Assignee: Sony Corporation, Tokyo, Japan

[21] Appl. No.: 598,945

[22] Filed: Feb. 9, 1996

[30] Foreign Application Priority Data

Feb. 20, 1995 [JP] Japan .................... 7-055169

[51] Int. Cl.⁶ ............................ H04L 7/00
[52] U.S. Cl. ............ 375/354; 370/474; 455/462
[58] Field of Search ............... 375/354, 377;
377/77, 75; 379/61; 326/38, 37; 341/101;
370/300, 476, 912, 913, 915, 474

[56] References Cited

U.S. PATENT DOCUMENTS 3,533,102  10/1970  Rowe ........................ 340/347
4,418,418  11/1983  Aoki ........................ 377/79
5,426,784  6/1995   Kawata et al. ............... 395/800

FOREIGN PATENT DOCUMENTS 2011140  7/1979  United Kingdom ........... H03K 5/156

Primary Examiner—Stephen Chin
Assistant Examiner—Betsy L. Deppe
Attorney, Agent, or Firm—Jay H. Maioli

[57] ABSTRACT

A data transfer circuit for use with a base unit or a handset of a telephone system includes a switch circuit and a shift register. The switch circuit selects parallel fixed data or parallel input data, and outputs the selected data. The switch circuit is connected to inputs indicating whether the data transfer circuit is connected to a base unit or a handset for modifying the parallel fixed data in response to the indication. The shift register has two modes. In the first mode, the data selected and output by the switch circuit is loaded into the shift register in parallel. In the second mode, the loaded data is output from the shift register in series.

3 Claims, 8 Drawing Sheets

DATA TRANSFER CIRCUIT FOR USE WITH A BASE UNIT OR A HANDSET OF A TELEPHONE SYSTEM

BACKGROUND OF THE INVENTION

1. Field of the Invention

The present invention relates to telephones, and more particularly, to a data transfer circuit best suited to cordless telephones or the like.

2. Description of the Related Art

In a cordless telephone, command signals indicating requests and parameters are transferred between the base unit and a handset in cases such as when the handset requires connection between them to the base unit for originating call and when the base unit requires a connection to the handset for receiving a call.

FIG. 7 shows an example of the format of such a command signal CMND. Signal CMND comprises a 16-bit sync signal BSYN at the top, and a 16-bit frame sync signal FSYN next. Sync signals BSYN and FSYN have specified bit patterns respectively. Frame sync signal FSYN sent from the handset to the base unit differs in its bit pattern from frame sync signal FSYN sent from the base unit to the handset.

Command signal CMND further comprises a 25-bit system identification code SYID preceded by signal FSYN, a 15-bit error correction code ECC for SYID, and 5-byte 40-bit control code CTRL. System identification code SYID is used for discriminating the local unit from the remote unit. In control code CTRL, the first byte indicates control for the handset and the base unit, and the second to the fifth bytes indicate parameters or data related to the first byte.

When the handset or the base unit receives command signal CMND, whether the identification code SYID included in the command signal CMND matches identification code stored in the local unit is checked. Only if they match, the command signal CMND is determined to be valid. Otherwise, it is determined to be invalid. For simplicity, data ranging from identification code SYID to control code CTRL will be called user data USRD in the following descriptions.

Such a command signal CMND can be obtained, for example, in a transfer circuit shown in FIG. 8.

There are provided three 16-bit memories 11 to 13 (shift registers with serial input and serial output). Bit sync signal BSYN is arranged in memory 11, frame sync signal FSYN for the base unit is arranged in memory 12, and frame sync signal FSYN for the handset is arranged in memory 13.

There is also provided a 16-bit shift register 14 with serial input and parallel outputs, 16-bit buffer memory 15 with parallel inputs and serial output, and a 16-bit shift register 16 with serial input and serial output used for data transfer.

There is also provided a timing generator 19 and switch circuits 17 and 18. The signals output from the timing generator 19 are supplied to the switch circuits 17 and 18 as control signals. Shift clocks SHFT, also generated in the timing generator, are supplied to the memory 11 to 13 and the shift register 16.

When a microcomputer (not shown) sends a signal indicating permission or direction for forming command signal CMND to the timing generator 19, the switch circuit 18 connects the memory 11 to the shift register 16 during period $T_1$ corresponding to the first 16 clocks of shift clocks SHFT.

Therefore, bit sync signal BSYN stored in the memory 11 is taken out and supplied to the shift register 16 through the switch circuit 18 during the first 16-clock period, $T_1$.

In the second 16-clock period, $T_2$, the switch circuit 18 connects the memory 12 to the shift register 16 if this transfer circuit is provided for the base unit, and the switch circuit 18 connects memory 13 to the ship register 16 if the transfer circuit is provided for the handset.

Therefore, frame sync signal FSYN for the base unit stored in the memory 12 or frame sync signal FSYN for the handset stored in the memory 13 is taken out and transferred to the shift register 16 through the switch circuit 18 in the second 16-clock period, $T_2$. At the same time, bit sync signal BSYN transferred during $T_1$ is output from the shift register 16 to pin 22 in synchronization with shift clocks SHFT.

During period $T_2$, the first 16 bits of user data USRD are supplied in series from pin 21 to the shift register 14. Input clock INCK is also supplied from the timing generator 19 to the shift register 14 to load the first 16 bits of user data USRD to the shift register 14.

When the first 16 bits of user data USRD have been loaded into the register 14 in period $T_2$, the switch circuit 17 is connected as shown in the figure. Latch pulse CLAT is supplied from the timing generator 19 to the memory 15 through the switch circuit 17. The first 16 bits of user data USRD loaded into the register 14 are latched in parallel in the memory 15.

In the third 16-clock period, $T_3$, the switch circuit 17 is connected to the terminal opposite to the connected terminal shows in the figure. Shift clocks SHFT are supplied to the memory 15 through the switch circuit 17. The switch circuit 18 is connected to the memory 15.

Therefore, the data in the memory 15, that is, the first 16 bits of user data USRD loaded into the memory 15 in period $T_2$, are transferred to the shift register 16 through the switch circuit 18 in the third 16-clock period, $T_3$. At the same time, frame sync signal FSYN transferred during $T_2$ is output from the shift register 16 to pin 22 in synchronization with shift clocks SHFT.

During period $T_3$, the next 16 bits of user data USRD are supplied in series from pin 21 to the shift register 14. Input clock INCK is also supplied to the shift register 14 from the timing generator 19 to load the these 16 bits of user data USRD into the shift register 14.

When the these 16 bits of user data USRD have been loaded into the register 14 in period $T_3$, latch pulse ChaT is supplied to the memory 15 through the switch circuit 17. The 16 bits of user data USRD loaded into the register 14 are transferred in parallel to the memory 15 and latched.

In the fourth 16-clock period, $T_4$, shift clocks SHFT are supplied to the memory 15 through the switch circuit 17. The switch circuit 18 is connected to the memory 15.

Therefore, the data in the memory 15, that is, the 16 bits of user data USRD loaded into the memory 15 in period $T_3$, are transferred to the shift register 16 through the switch circuit 18 in the fourth 16-clock period, $T_4$. At the same time, the first 16 bits of user data USRD transferred during $T_3$ is output from the shift register 16 in synchronization with shift clocks SHFT and taken out from pin 22.

The same operations as those performed in $T_3$ and $T_4$ are repeated afterward. When all of user data USRD is taken out from pin 22, the output of one command signal CMND is finished.

As described above, command signal CMND can be output in the transfer circuit shown in FIG. 8.

In the above-described transfer circuit, sync signals BSYN and FSYN are transferred to the memory 11 to 13. Although sync signals BSYN and FSYN are fixed data, these signals have to be set in the memory 11 to 13 every time command signal CMND is sent.

SUMMARY OF THE INVENTION

The present invention has been made to solve the above problem.

Accordingly, it is an object of the present invention to provide a data transfer circuit which does not require the repeated setting of fixed data.

The foregoing object is achieved according to this invention through the provision of a data transfer circuit comprising: a switch circuit for selecting parallel input data or parallel fixed data and for outputting the selected data; and a shift register having a first mode for loading in parallel the data selected and output by the switching circuit and a second mode for outputting the loaded data in series.

Fixed data or input data is loaded in parallel into the shift register through the switch circuit, and afterward, taken out from the shift register in series.

According to this invention, since sync generators can be configured only with connections to signal lines without the use of flip-flops or the like, it is not necessary to set sync signals every time a command signal is sent. This reduces power consumption as well as the size of the required circuit.

DETAILED DESCRIPTION OF THE PREFERRED EMBODIMENT

Figure 1:
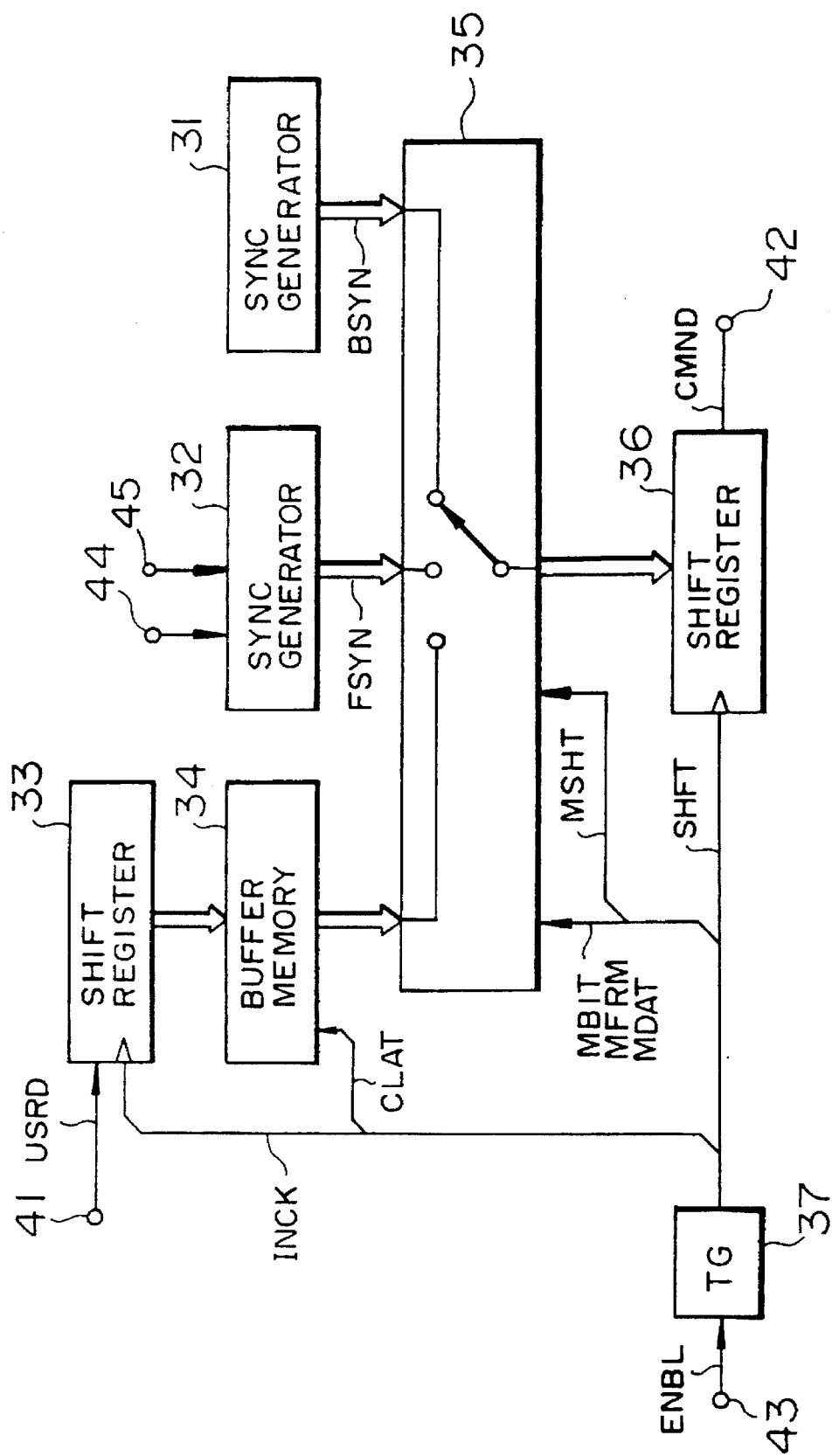
FIG. 1 is a block diagram according to an embodiment of the present invention.

FIG. 1 are a block diagram according to an embodiment of the present invention. There is shown sync generators 31 and 32. The sync generator 31 generates a 16-bit bit synchronizing signal, BSYN, and the sync generator 32 generates a 16-bit frame synchronizing signal, FSYN. The sync generator 32 is configured so that it generates frame synchronizing signal FSYN for the base unit or a handset according to the level of terminal 44 and 45, a high level (H) or low level (L).

The sync generators 31 and 32 output generated sync signals BSYN and FSYN in parallel. Sync signals BSYN and FSYN are formed by connecting the signal line corresponding to each bit of BSYN and FSYN to a high-level or low-level signal line (details will described later).

There are provided a 16-bit shift register 33 having serial input and parallel outputs and 16-bit buffer memory 34 having parallel inputs and parallel outputs.

There is also provided a 16-bit shift register 36 having parallel inputs and serial output. This shift register 36 serves as buffer memory and a shift register for data transfer. When shift active signal MSHT is low, the shift register 36 operates in memory mode as buffer memory, and when MSHT is high, the shift register 36 operates in register mode as a shift register for outputting the buffered data. The shift register 36 can be configured with 16 D flip-flops with their connections being switched (details will be described later).

There is also provided a timing generator 37. Signal ENBL, which enables or directs a command signal CMND to be formed, is fed in at pin 43 from the microcomputer (not shown) to the timing generator 37. According to this enable signal, ENBL, the generator 37 generates various types of signals and supplies them to circuits.

Figure 2:
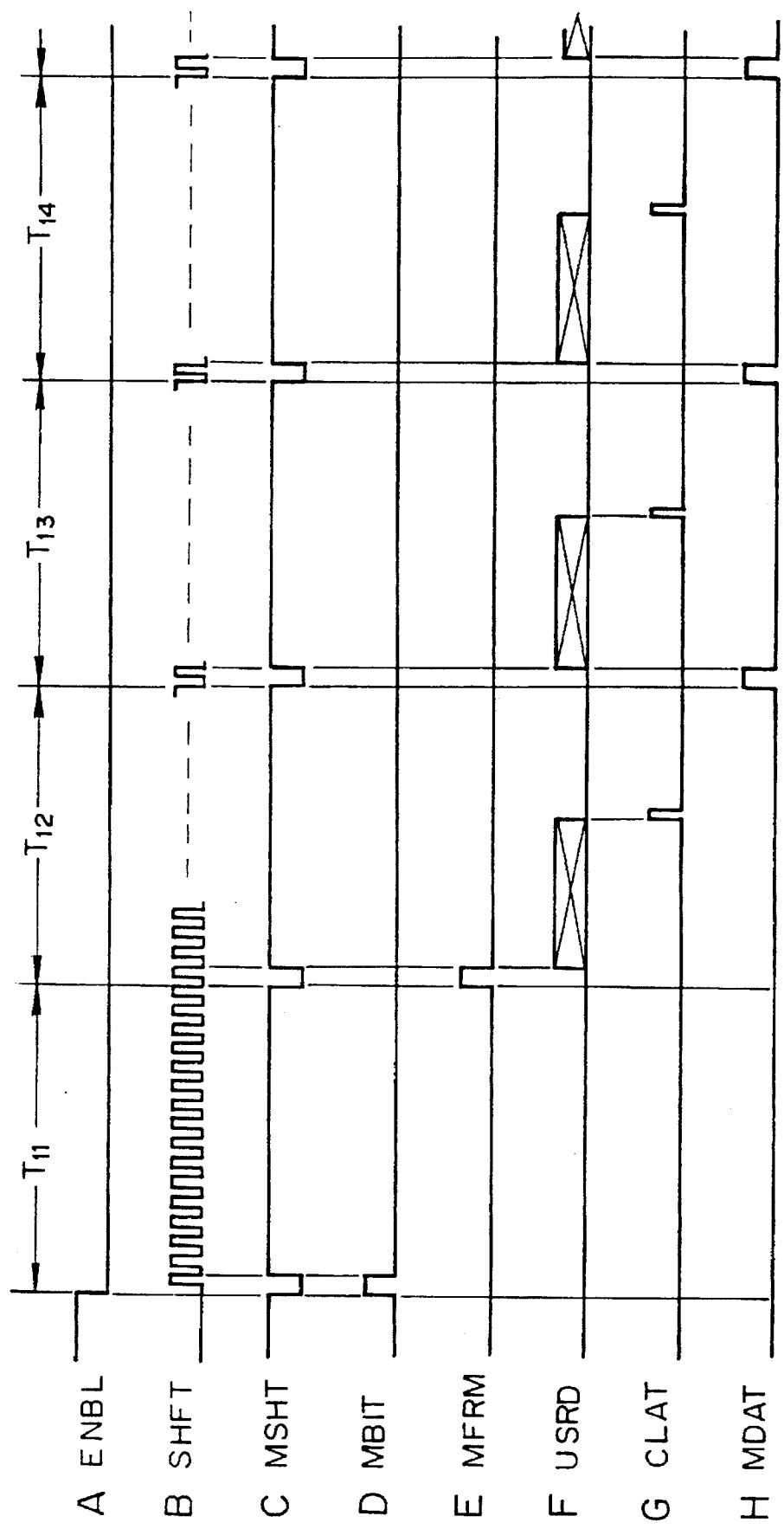
FIG. 2 is a timing chart of signals used in the embodiment of the present invention.

With this configuration, when enable signal ENBL changes from high to low at a certain time as shown in A of FIG. 2, the timing generator 37 starts generating shift clocks SHFT as shown in B of FIG. 2 and supplies them to the shift register 36.

Shift active signal MSHT, which is low only during the period of the first one clock in period $T_{11}$ corresponding to 16 clocks of shift clocks SHFT, is generated in the timing generator 37 as shown in C of FIG. 2. This signal is sent to the register 36 and the register 36 stays in memory mode while the signal is low.

Bit active signal MBIT, which is high only during the period of the first one clock in period $T_{11}$, corresponding to 16 clocks of shift clocks SHFT, is generated in the timing generator 37 as shown in D of FIG. 2. This signal is sent to the switch circuit 35 to connect it to the sync generator 31.

The sync generator 31 supplies bit sync signal BSYN to the register 36 in parallel through the switch circuit 35, and the bit sync signal is loaded into the register 36 at the rising edge of the first clock of shift clocks SHFT.

In the rest of period $T_{11}$, MSHT is high and the register 36 is in register mode. Shift clocks SHFT are continuously supplied to the register 36. Bit sync signal BSYN loaded into the register 36 is output from the register 36 in series, one bit at a time, to pin 42.

With the above-described operations, bit sync signal BSYN, output from the sync generator 31, is obtained at pin 42 in period $T_{11}$, corresponding to the first 16 clocks.

In period $T_{12}$ corresponding to the second 16 clocks of shift clocks SHFT, MSHT is low only during the period of the first clock, and the register 36 is in memory mode at that period. Frame active signal MFRM, which is high only during the period of the first one clock in period $T_{12}$, is generated in the timing generator 37 as shown in E of FIG. 2. This signal is sent to the switch circuit 35 to connect it to the sync generator The sync generator 32 supplies frame sync signal FSYN to the register 36 in parallel through the switch circuit 35, and the frame sync signal is loaded into the register 36 at the rising edge of the first clock of shift clocks SHFT.

In the rest of period $T_{12}$, MSHT is high and the register 36 is in register mode. Shift clocks SHFT are continuously supplied to the register 36. Frame sync signal FSYN loaded into the register 36 is output from the register 36 in series, one bit at a time, to pin 42.

With the above-described operations, frame sync signal FSYN, output from the sync generator 32, is obtained at pin 42 in period $T_{12}$, corresponding to the second 16 clocks.

In the first half of $T_{12}$, corresponding to the second 16 clocks, the first 16 bits of user data USRD is supplied to the shift register 33 in series through pin 41 from the microcomputer as shown in F of FIG. 2. These first 16 bits of user data USRD are loaded into the register 33 with input. clock INCK generated in the timing generator 37 being supplied to the shift register 33.

When the first 16 bits of the user data have been loaded into the register 33, latch pulse CLAT is output from the timing generator 37 to the memory 34. The first 16 bits of user data USRD loaded into the register 33 are sent to the memory 34 in parallel and latched.

In period $T_{13}$ corresponding to the third 16 clocks of shift clocks SHFT, MSHT becomes low only during the period of the first clock and the register 36 enters memory mode. Data active signal MDAT, which is high only during the period of the first one clock in period $T_{13}$, is generated in the timing generator 37 as shown in H of FIG. 2. This signal is sent to the switch circuit 35 to connect it to the memory 34.

The first 16 bits of user data USRD latched in memory 34 are supplied to the register 36 in parallel through the switch circuit 35 in period $T_{12}$, and the bits are loaded into the register 36 at the rising edge of the first clock of shift clocks SHFT.

In the rest of period $T_{13}$, MSHT is high and the register 36 is in register mode. Shift clocks SHFT are continuously supplied to the register 36. The first 16 bits of user data USRD loaded into the register 36 are output from the register 36 in series, one bit at a time, to pin 42.

With the above-described operations, the first 16 bits of user bits USRD are obtained at pin 42 in period $T_{13}$, corresponding to the third 16 clocks.

In the first half of $T_{13}$, corresponding to the third 16 clocks, the next 16 bits of user data USRD are supplied to the shift register 33 in series through pin 41 from the microcomputer as shown in F of FIG. 2. These 16 bits of user data USRD are loaded into the register 33 with input clock INCK generated in the timing generator 37 being supplied to the shift register When the 16 bits of the user data have been loaded into the register register 33, latch pulse CLAT is output from the timing generator 37 to the memory 34. The 16 bits of user data USRD loaded into the register 33 are sent to the memory 34 in parallel and latched.

The operations performed in period $T_{13}$ are repeated until all of user data USRD is taken out from pin 42. Then, the output of a command signal CMND is terminated.

As described above, command signal CMND is formed in the transfer circuit shown in FIG. 1. The sync generators 31 and 32 form sync signals BSYN and FSYN, with each bit of the signal lines of sync signals BSYN and FSYN being connected to a power line or ground line, and output them in parallel. Pins 44 and 45 are used to form the FSYN signal and are set to high or low depending on whether the transfer circuit is connected to a base unit or a handset.

Therefore, the sync generators 31 and 32 can be configured with connections of the signal lines without the use of flip-flop circuits or the like. It is not necessary to set sync signals BSYN and FSYN each time command-signal CMND is sent. This reduces power consumption as well as the size of the required circuit.

And also, there is no need to change the control of the switch circuit 35 when the transfer circuit is used for the base unit and when the circuit is used for a handset.

Figure 3:
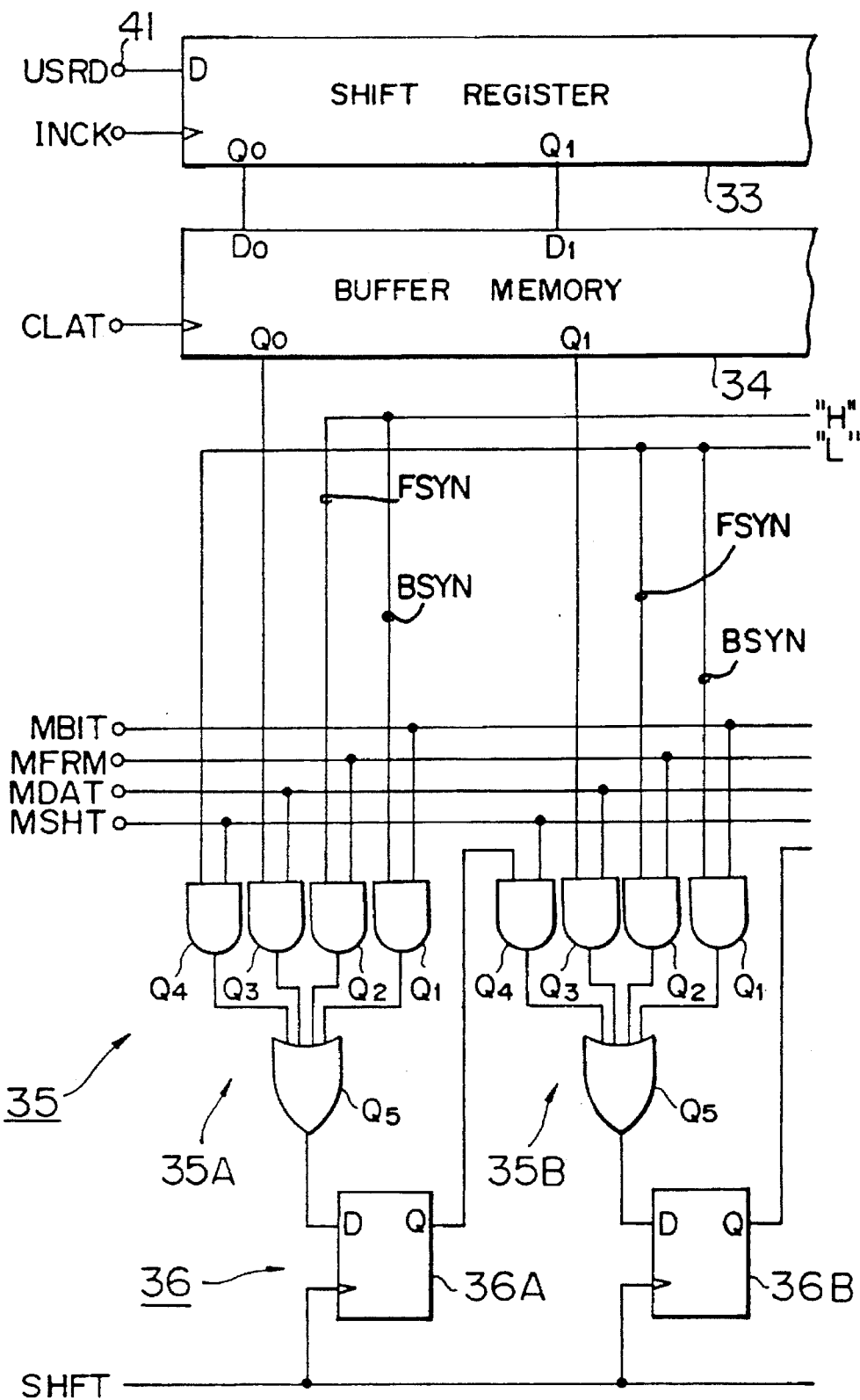
FIG. 3 is a circuit diagram showing a part of the embodiment of the present invention.
Figure 4:
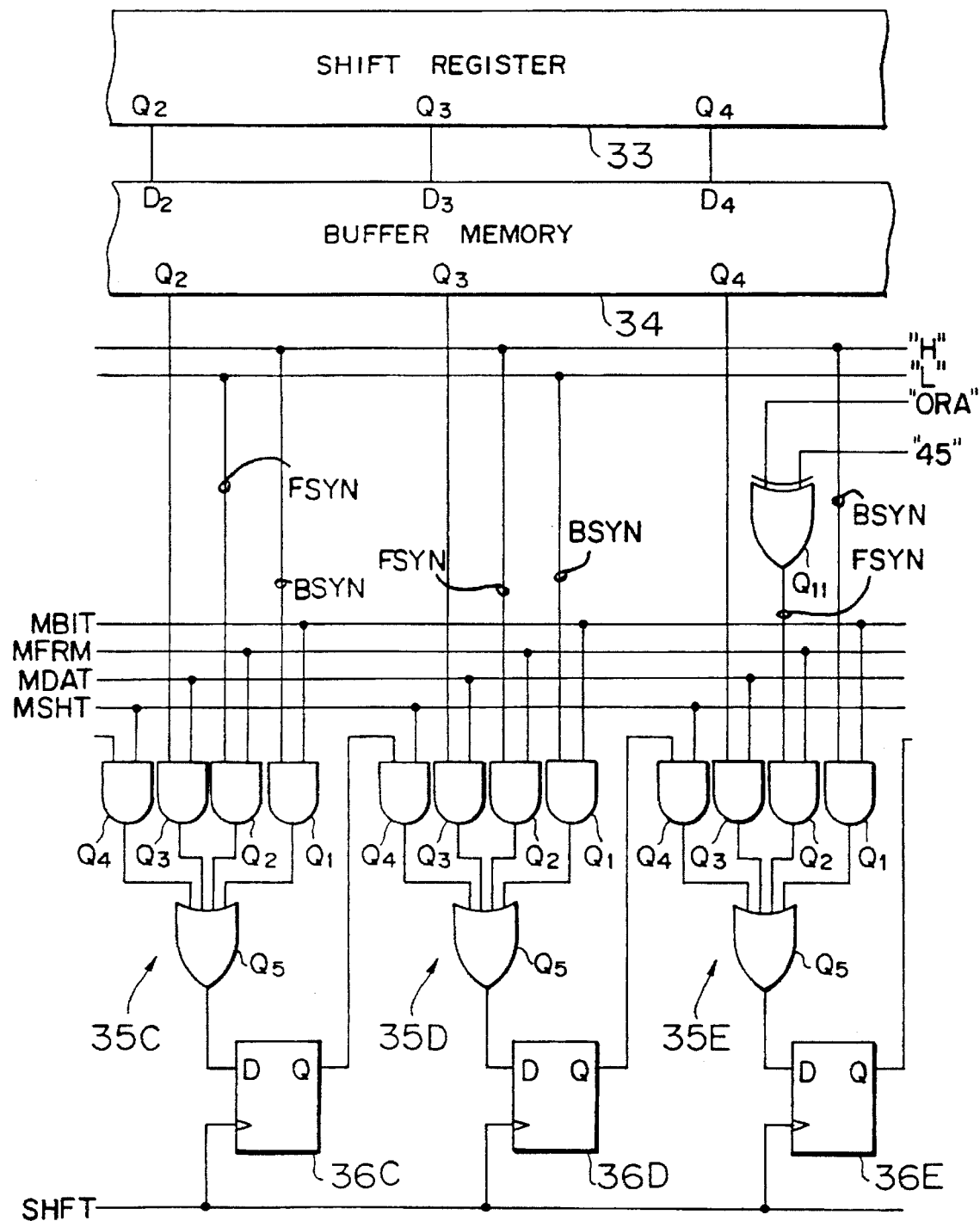
FIG. 4 is a circuit diagram showing another part of the embodiment, which connects to the part shown in FIG. 3.
Figure 5:
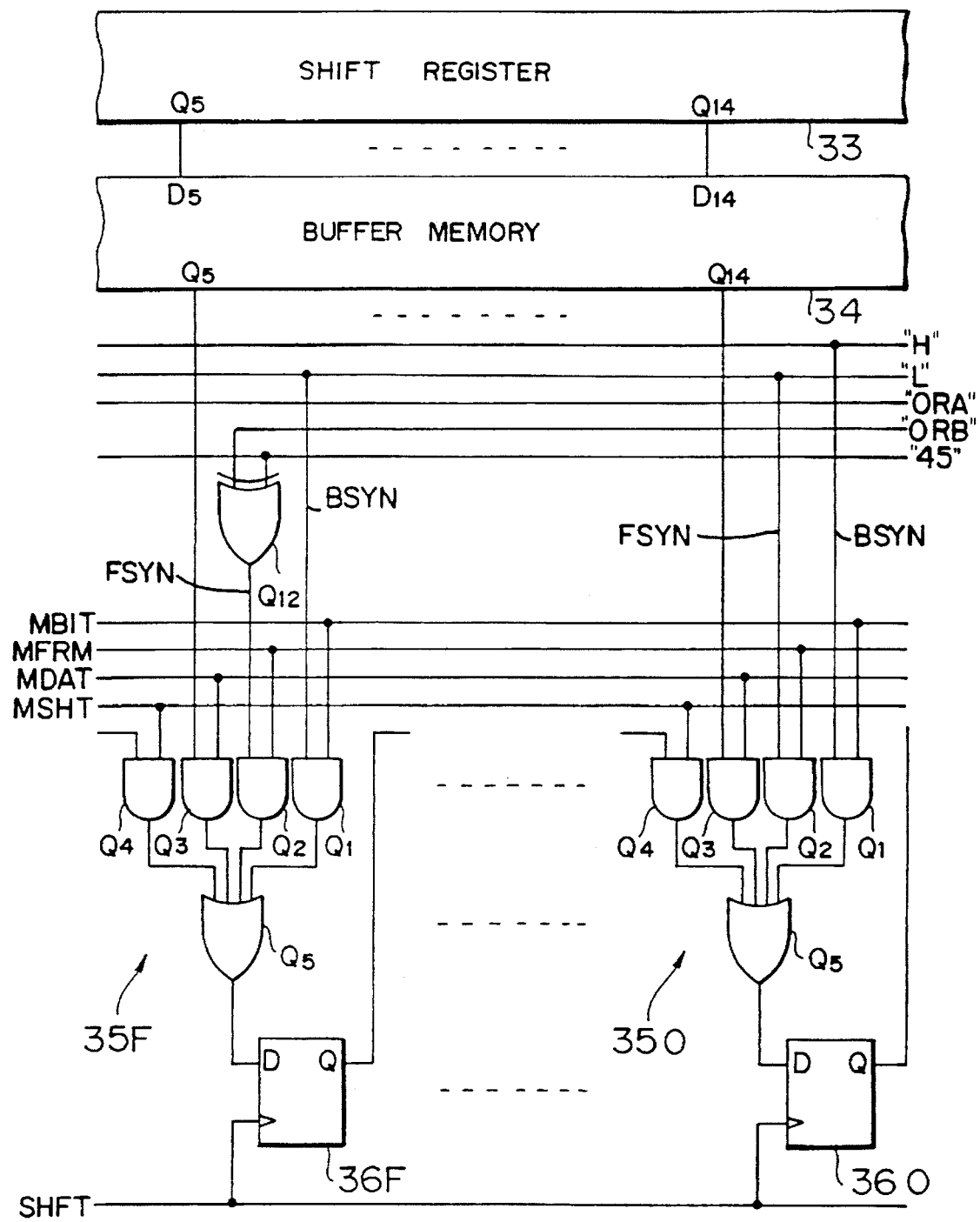
FIG. 5 is a circuit diagram showing still another part of the embodiment, which connects to the part shown in FIG. 4.
Figure 6:
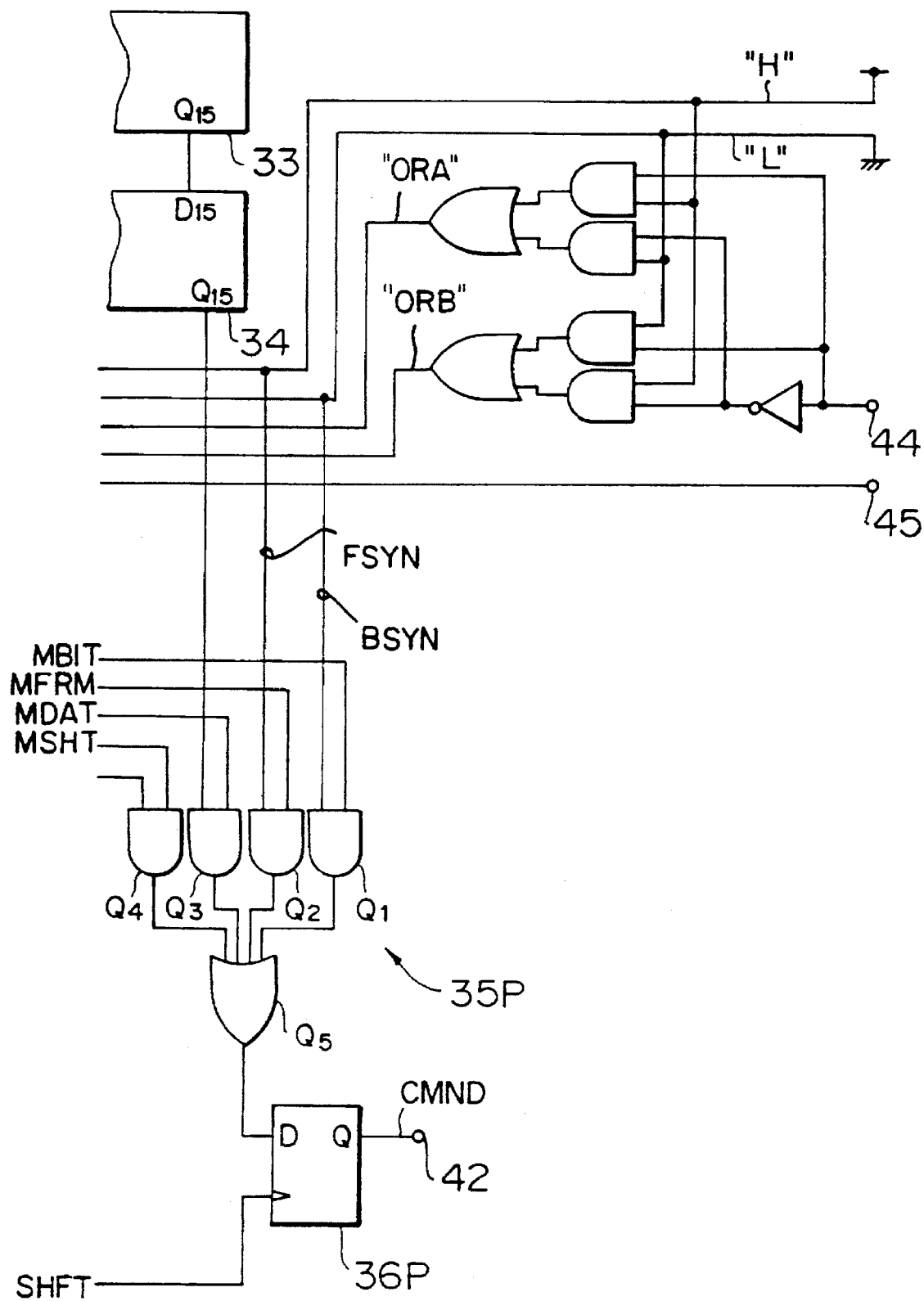
FIG. 6 is a circuit diagram showing yet another part of the embodiment, which connects to the part shown in FIG. 5.
Figure 7:
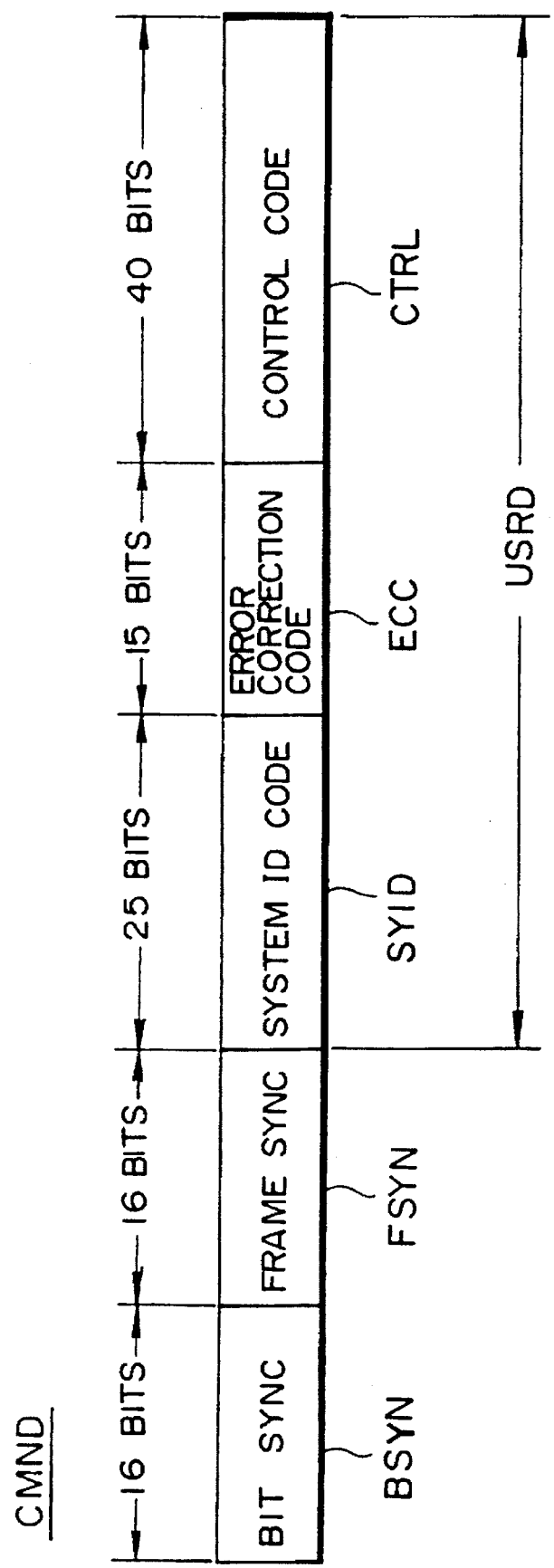
FIG. 7 shows a signal format.
Figure 8:
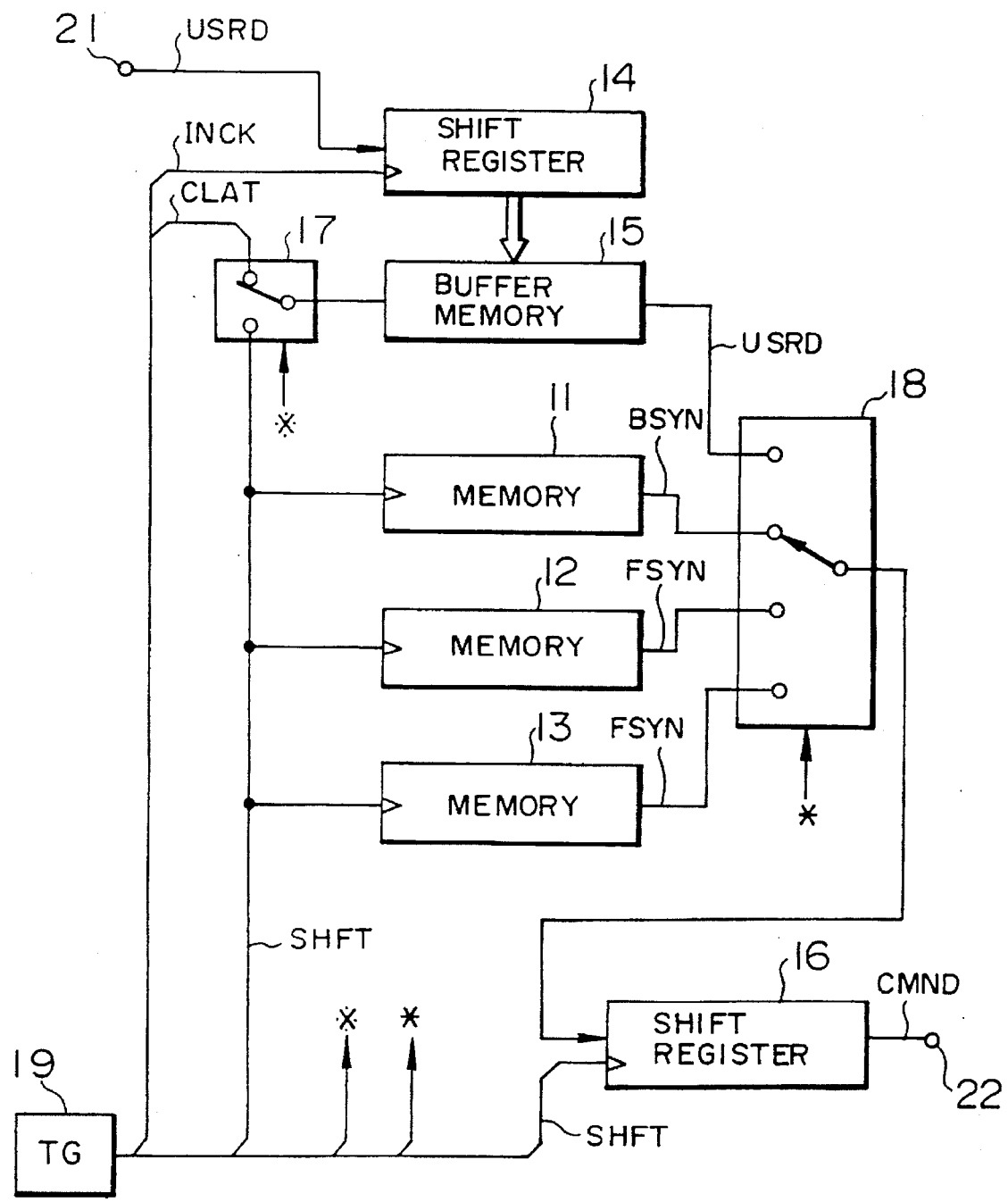
FIG. 8 is a block diagram according to a conventional circuit.

FIGS. 3 to 6 show an example of the above-described transfer circuit. The circuit is divided and a part of the circuit is omitted due to lack of space on the sheets. The right-hand side of FIG. 3 is connected to the left-hand side of FIG. 4, the right-hand side of FIG. 4 is connected to the left-hand side of FIG. 5, and the right-hand side of FIG. 5 is connected to the left-hand side of FIG. 6.

The switch circuit 35 comprises 16 switch sections 35A to 35P. Each of the switch sections 35A to 35P comprises four AND gates Q1 to Q4 and one OR gate Q5. The shift register 36 comprises 16 D flip-flops 36A to 36P.

AND gates Q1 select bit sync signal BSYN and supply it to the shift register 36. With a high signal line and a low signal line being connected to AND gates Q1 at a specified pattern, the sync generator 31 for generating bit sync signal BSYN is configured.

AND gates Q2 select frame sync signal FSYN and supply it to the shift register 36. Depending on whether the transfer circuit is connected to the base unit or a handset, pins 44 and 45 are set to high or low, setting the output levels of exclusive OR gates Q11 and Q12 to high or low. With the signal lines of these outputs, a high signal line, and a low signal line being connected to AND gates Q2 at a specified pattern, the sync generator 32 for generating frame sync signal FSYN is configured.

AND gates Q3 select user data USRD and supply it to the shift register 36. AND gates Q4 switch the operation mode of the shift register 36 between memory mode and register mode, and are part of the switch circuit 35.

The shift register 33 can be configured with 16 D flip-flops connected in cascade. The buffer memory 34 can be configured with 16 D flip-flops provided separately.

When user data USRD is supplied in series to the shift register 33 and input clock INCK is sent, user data USRD is loaded into the shift register 33. When latch pulse CLAT is supplied to the buffer memory 34, 16-bit user data USRD in the shift register 33 is loaded into the memory 34 in parallel. The memory 34 outputs user data USRD in units of 16 bits in parallel.

With these operations being performed in the first halves of periods $T_{12}$, $T_{13}$, $T_{14}$, etc., it becomes ready to send user data USRD.

Since MSHT is low in the period of the first clock in period $T_{11}$ (the first clock of shift clocks SHFT), flip-flops 36A to 36P are independent of each other (in memory mode) due to AND gates Q4. Since MBIT is high in this one-clock period, bit sync signal BSYN is supplied to flip-flops 36A to 36P in parallel through AND gates Q1. Clocks SHFT are also supplied to flip-flops 36A to 36P. Therefore, bit sync signal BSYN is loaded into flip-flops 36A to 36P in parallel.

In the rest of period $T_{11}$, since MSHT is high, flip-flops 36A to 36P are cascade-connected through AND gates Q4 to compose the shift register (in register mode). Bit sync signal BSYN loaded into flip-flops 36A to 36P is taken out from the flip-flop 36P in series when shift clocks SHFT are supplied.

Since MSHT is low in the period of the first clock in period $T_{12}$, flip-flops 36A to 36P are independent of each other (memory mode) due to AND gates Q4. Since MFRM is high in this one-clock period, frame sync signal FSYN is supplied to flip-flops 36A to 36P in parallel through AND gates Q2. Clocks SHFT are also supplied to flip-flops 36A to 36P. Therefore, frame sync signal FSYN is loaded into flip-flops 36A to 36P in parallel.

In the rest of period $T_{12}2$, since MSHT is high, flip-flops 36A to 36P are cascade-connected through AND gates Q4 to compose the shift register (in register mode). Frame sync signal FSYN loaded into flip-flops 36A to 36P is taken out from the flip-flop 36P in series when shift clocks SHFT are supplied.

Since MSHT is low in the period of the first clock in period $T_{13}$, flip-flops 36A to 36P are independent of each other (in memory mode) due to AND gates Q4. Since MDAT is high in this one-clock period, the first 16-bits of user data USRD are supplied to flip-flops 36A to 36P in parallel through AND gates Q3. Clocks SHFT are also supplied to flip-flops 36A to 36P. Therefore, the first 16 bits of user data USRD are loaded into flip-flops 36A to 36P in parallel.

In the rest of period $T_{13}$, since MSHT is high, flip-flops 36A to 36P are cascade-connected through AND gates Q4 to compose the shift register (in register mode). The first 16 bits of user data USRD loaded into flip-flops 36A to 36P are taken out from the flip-flop 36P in series when shift clocks SHFT are supplied.

The same operations as those performed in period $T_{13}$ are repeated afterward. When all of user data USRD is taken out, the output of one command signal CMND is terminated.

As described above, when this transfer circuit is used to output command signal CMND, sync signals BSYN and FSYN are formed with each bit of these signal lines being connected to a high-level signal line or a low-level signal line, allowing the sync generators 31 and 32 to be configured with connections of the signal lines without the use of flip-flops and so on. Therefore, it is not necessary to set sync signals BSYN and FSYN each time command signal CMND is sent. This reduces power consumption as well as the size of the required circuit.

What is claimed is:

1. A data transfer circuit for use with a base unit or a handset of a telephone system for generating a signal formed of fixed data and input data, said fixed data and said input data being represented by respective sets of data bits, and said circuit comprising:

a switch circuit for selecting parallel input data or parallel fixed data formed with each bit of each parallel fixed data being connected to a high-level signal line or a low-level signal line and for supplying the selected data as a parallel output, said switch circuit being connected to inputs indicating whether the data transfer circuit is connected to a base unit or a handset for modifying the parallel fixed data in response to the indication; and a shift register responsive to said parallel output and having a first mode for loading the selected data in parallel and a second mode for supplying the loaded, selected data as a series output.

2. A data transfer circuit according to claim 1 wherein said shift register comprises flip-flops corresponding to the bits of said parallel fixed data or said parallel input data with one-to-one correspondence, said flip-flops being separated from each other in said first mode and said flip-flops being connected in cascade in said second mode.

3. A data transfer circuit according to claim 1 further comprising:

another shift register having a serial input and parallel outputs; and a buffer memory for receiving the output of said another shift register in parallel, wherein said input data is supplied in series to said serial input of said another shift register and said parallel input data is output from said buffer memory to said switch circuit.

* * * * *